(12) United States Patent
Lin et al.

(10) Patent No.: US 7,046,418 B2
(45) Date of Patent: May 16, 2006

(54) REVERSIBLE ELECTRODEPOSITION DEVICES AND ASSOCIATED ELECTROCHEMICAL MEDIA

(75) Inventors: Rongguang Lin, Holland, MI (US); David A. Theiste, Byron Center, MI (US); Thomas F. Guarr, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 10/681,538

(22) Filed: Oct. 8, 2003

(65) Prior Publication Data

US 2005/0078347 A1    Apr. 14, 2005

(51) Int. Cl.
- G02F 1/15 (2006.01)
- G02F 1/153 (2006.01)
- G02F 1/00 (2006.01)

(52) U.S. Cl. .............. 359/265; 359/272; 359/273; 252/583

(58) Field of Classification Search ........ 359/265–275; 252/583
See application file for complete search history.

(56) References Cited

U.S. PATENT DOCUMENTS

| | | | | |
|---|---|---|---|---|
| 5,056,899 A | 10/1991 | Warszawski | ............... | 359/265 |
| 5,764,401 A | 6/1998 | Udaka et al. | ............... | 309/270 |
| 5,880,872 A | 3/1999 | Udaka | ................ | 359/273 |
| 5,903,382 A | 5/1999 | Tench et al. | ............... | 359/265 |
| 5,923,456 A | 7/1999 | Tench et al. | ............... | 359/266 |
| 5,940,201 A | 8/1999 | Ash et al. | ................ | 359/267 |
| 6,111,685 A | 8/2000 | Tench et al. | ............... | 359/267 |
| 6,137,620 A | 10/2000 | Guarr et al. | ............... | 359/620 |
| 6,141,137 A | 10/2000 | Byker et al. | ............... | 359/265 |
| 6,166,847 A | 12/2000 | Tench et al. | ............... | 359/266 |
| 6,188,505 B1 | 2/2001 | Lomprey et al. | ........... | 359/265 |
| 6,193,912 B1 | 2/2001 | Thieste et al. | .............. | 252/583 |
| 6,256,135 B1 | 7/2001 | Tench et al. | ............... | 359/271 |
| 6,262,832 B1 | 7/2001 | Lomprey et al. | ........... | 359/265 |
| 6,310,714 B1 * | 10/2001 | Lomprey et al. | ........... | 359/265 |
| 6,353,493 B1 | 3/2002 | Guarr et al. | ................ | 359/273 |
| 6,392,783 B1 | 5/2002 | Lomprey et al. | ........... | 359/265 |
| 6,400,491 B1 * | 6/2002 | Tench et al. | ............... | 359/270 |
| 6,433,914 B1 | 8/2002 | Lomprey et al. | ........... | 359/265 |
| 6,445,486 B1 | 9/2002 | Lomprey et al. | ........... | 359/265 |
| 6,486,998 B1 | 11/2002 | Lomprey et al. | ........... | 359/265 |
| 6,496,294 B1 | 12/2002 | Lomprey et al. | ........... | 359/265 |
| 6,594,066 B1 | 7/2003 | Lomprey et al. | ........... | 359/265 |
| 6,614,578 B1 | 9/2003 | Giri et al. | .................... | 359/265 |
| 6,697,185 B1 | 2/2004 | Lomprey et al. | ........... | 359/265 |
| 6,700,693 B1 | 3/2004 | Roberts et al. | ............. | 359/265 |
| 6,710,906 B1 | 3/2004 | Guarr et al. | ................ | 359/265 |
| 6,735,011 B1 | 5/2004 | Lomprey et al. | ........... | 359/265 |

* cited by examiner

Primary Examiner—Ricky L. Mack
Assistant Examiner—William Choi
(74) Attorney, Agent, or Firm—King & Partners,PLC

(57) ABSTRACT

The present invention is directed to a reversible electrodeposition device comprising: a first substrate having an electrically conductive material associated therewith; a second substrate having an electrically conductive material associated therewith; a nucleation layer at least partially covering at least one of the electrically conductive materials of the first and second substrates; an electrochemical medium contained within a chamber positioned between the first and second substrates which comprises: at least one solvent; an anodic electroactive material; and cathodic electroactive material; and compositions and/or concentrations associated with the electrochemical medium which enhances the electrochemical performance of the electrodeposition device.

44 Claims, 1 Drawing Sheet

US 7,046,418 B2

REVERSIBLE ELECTRODEPOSITION DEVICES AND ASSOCIATED ELECTROCHEMICAL MEDIA

BACKGROUND OF THE INVENTION

1. Field of the Invention

The present invention relates in general to electrochemical devices, and, more particularly, to reversible electrodeposition devices having electrochemical media which serve to enhance both durability and reversible deposition uniformity of the electrodeposition devices relative to the same without such electrochemical media.

2. Background Art

Electrodeposition devices have been known in the art for several years and are the subject of a plurality of United States Patents, including, for example, U.S. Pat. No. 5,056,899 entitled "Material For Light Modulation and Manufacturing Process," U.S. Pat. No. 5,903,382 entitled "Electrodeposition Cell With High Light Transmission," U.S. Pat. No. 5,923,456 entitled "Reversible Electrochemical Mirror," U.S. Pat. No. 6,111,685 entitled "Reversible Electrochemical Mirror (REM) With Improved Electrolytic Solution," and U.S. Pat. No. 6,166,847 entitled "Reversible Electrochemical Mirror For Modulation Of Reflected Radiation,"—just to name a few.

Generally, electrodeposition devices can be categorized into two groups, namely: "rocking chair" type electrodeposition devices wherein deposition/plating occurs via a plating-solution-plating mechanism (e.g. U.S. Pat. No. 5,903,382), and electrodeposition devices wherein deposition takes place while oxidation of a halide occurs at the anode (e.g. U.S. Pat. No. 5,056,899). While the above-identified electrodeposition devices have been known in the art for years, operational limitations and device configurations remain largely problematic, or at least, less than desirable for commercial applications.

For example, some electrodeposition devices can be susceptible to dendrite formation at or near an electrode, which, in turn, can adversely affect the electrochemical performance of the device, and in some circumstances render the electrodeposition device inoperable—even after only relatively few cycles (i.e. a transition from a high transmission state to a low transmission state). Moreover, several of the "rocking chair" type electrodeposition devices incorporate specially configured anodes which are distributed in localized, patterned areas and/or utilize a specially modified cathode as is disclosed in U.S. Pat. No. 5,923,456. Such configurations can materially increase manufacturing complexity, as well as compromise optical performance due to gridlines, dots, etcetera.

Electrodeposition devices as disclosed in U.S. Pat. No. 5,056,899 suffer from numerous drawbacks, the details of which are well disclosed in U.S. Pat. No. 5,903,382 and related cases.

It has now been surprisingly discovered that electrodeposition devices can be fabricated which exhibit enhanced durability by controllably selecting concentrations of anodic and/or cathodic materials within the electrochemical media without such complex device configurations. It has also been surprisingly discovered that incorporating redox buffers into the electrochemical media further enhances the electrochemical performance of such electrodeposition devices. (See, for example, U.S. Pat. Nos. 6,188,505; 6,310,714; and 6,433,914—all of which are hereby incorporated herein by reference in their entirety).

It is therefore an object of the present invention to provide an electrodeposition device having an electrochemical medium that remedies the aforementioned detriments and/or complications associated with conventional electrodeposition devices.

These and other objectives of the present invention will become apparent in light of the present specification, claims, and drawings.

SUMMARY OF THE INVENTION

The present invention is directed to a reversible electrodeposition device, comprising: (a) a first substrate having an electrically conductive material associated therewith; (b) a second substrate having an electrically conductive material associated therewith; (c) a nucleation layer at least partially covering at least one of the electrically conductive materials of the first and second substrates; (d) an electrochemical medium contained within a chamber positioned between the first and second substrates which comprises: (1) at least one solvent; (2) an anodic electroactive material; and (3) cathodic electroactive material; and (e) means associated with the electrochemical medium which enhances the electrochemical performance of the electrodeposition device. Such means preferably include, for example, the utilization of a redox buffer (i.e. a color-stabilizing additive) and/or a medium configuration wherein the concentration of the anodic electroactive material is greater than the cathodic electroactive material. In particular, the reversible electrodeposition devices of the present invention exhibit enhanced cyclic durability without the problematic formation of dendrites. Moreover, the reversible electrodeposition devices of the present invention do not exhibit material film aging even when maintained in a low transmission state for extended periods of time.

BRIEF DESCRIPTION OF THE DRAWINGS

The invention will now be described with reference to the drawings wherein.

DETAILED DESCRIPTION OF THE INVENTION

Figure 1:
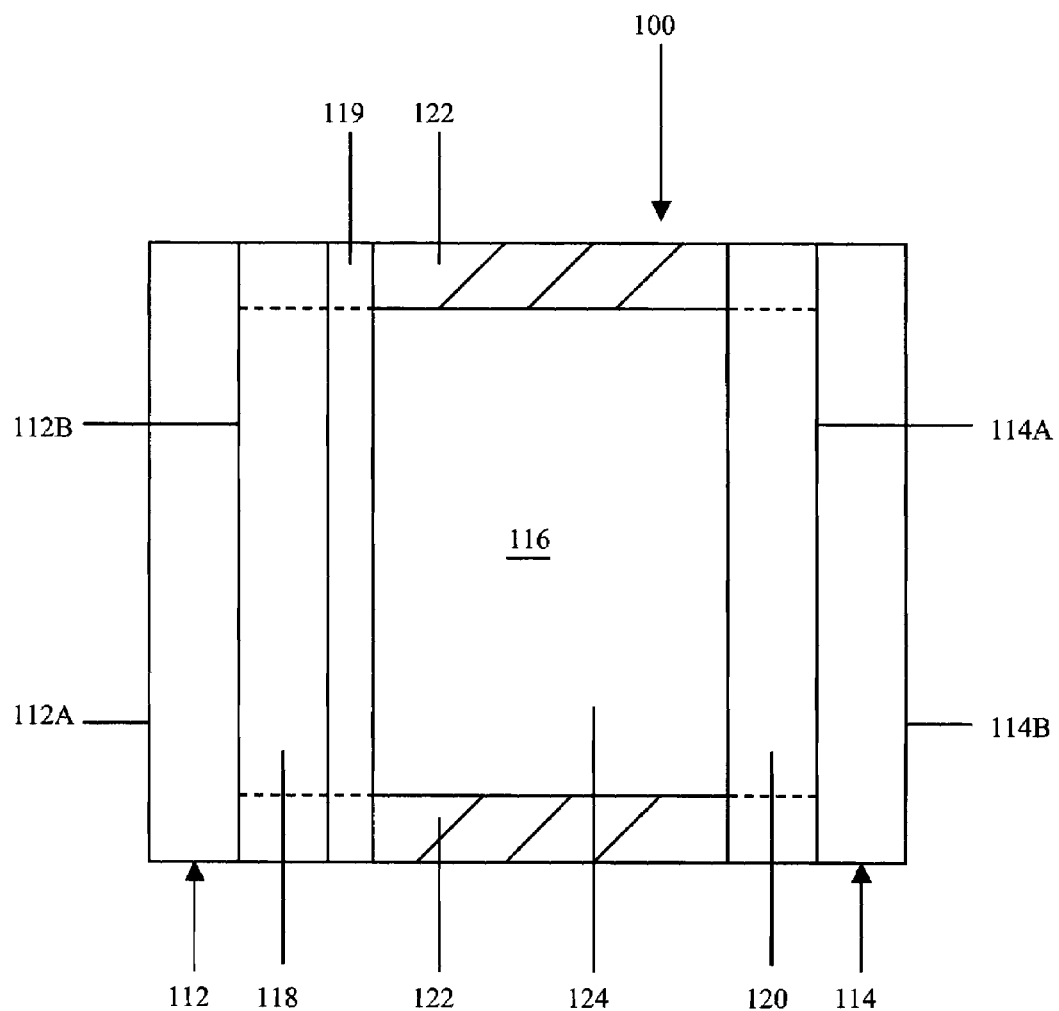
FIG. 1 of the drawings is a cross-sectional schematic representation of an electrodeposition device fabricated in accordance with the present invention.

Referring now to the drawings and to FIG. 1 in particular, a cross-sectional schematic representation of electrodeposition device 100 is shown, which generally comprises first substrate 112 having front surface 112A and rear surface 112B, second substrate 114 having front surface 114A and rear surface 114B, and chamber 116 for containing electrochemical medium 124. It will be understood that electrodeposition device 100 may comprise, for illustrative purposes only, a mirror, a window, a display device, a variable reflector, and the like. It will be further understood that FIG. 1 is merely a schematic representation of electrodeposition device 100. As such, some of the components have been distorted from their actual scale for pictorial clarity. Indeed, numerous other device configurations are contemplated for use, including those disclosed in U.S. Pat. No. 5,056,899 entitled "Material For Light Modulation and Manufacturing Process," U.S. Pat. No. 5,903,382 entitled "Electrodeposition Cell With High Light Transmission," U.S. Pat. No. 5,923,456 entitled "Reversible Electrochemical Mirror," U.S. Pat. No. 6,111,685 entitled "Reversible Electrochemical Mirror (REM) With Improved Electrolytic Solution," and U.S. Pat. No. 6,166,847 entitled "Reversible Electrochemical Mirror For Modulation Of Reflected Radiation," all of which are hereby incorporated herein by reference in their entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins, plastics, and/or composites including Topas®, which is commercially available from Ticona of Summit, New Jersey. First substrate 112 is preferably fabricated from a sheet of glass having a thickness ranging from approximately 0.5 millimeters (mm) to approximately 12.7 mm. Of course, the thickness of the substrate will depend largely upon the particular application of the electrodeposition device. While particular substrate materials have been disclosed, for illustrative purposes only, it will be understood that numerous other substrate materials are likewise contemplated for use—so long as the materials exhibit appropriate physical properties, such as strength, to be able to operate effectively in conditions of intended use. Indeed, electrodeposition devices in accordance with the present invention can be, during normal operation, exposed to extreme temperature variation as well as substantial UV radiation, emanating primarily from the sun. It will be further understood that substrate 112 may be modified by texturing either one of surfaces 112A or 112B, for example, by acid etching to form a diffusely reflecting device as is taught in U.S. Pat. No. 6,256,135 entitled "Diffusely-reflecting Reversible Electrochemical Mirror," which is hereby incorporated herein by reference in its entirety.

Second substrate 114 may be fabricated from similar materials as that of first substrate 112. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered, heat strengthened, and/or chemically strengthened, prior to or subsequent to being coated with layers of electrically conductive material (118 and 120).

One or more layers of electrically conductive material 118 are associated with rear surface 112B of first substrate 112. These layers serve as an electrode for the electrodeposition device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrodeposition device or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio., indium/tin oxide (ITO), doped zinc oxide or any one of a number of other materials known to those having ordinary skill in the art.

One or more nucleation layers 119 at least partially cover the inner surface, proximate chamber 116, of electrically conductive material 118. It will be understood that regardless of its ordinary meaning, the term "nucleation layer" will be defined herein as a layer of material that at least partially covers the inner surface proximate chamber 116 to reduce the overpotential for deposition and/or provide cathodic materials undergoing reduction with nucleation sites, to, in turn, enhance the uniformity of correspondingly deposited films.

Nucleation layer 119 may be fabricated from any one of a number of materials, including, but not limited to, transition metals, including, but not limited to, gold, platinum, etcetera. Preferably, nucleation layer 119 ranges in thickness from approximately 5 angstroms to approximately 100 angstroms, and more preferably between approximately 10 angstroms and approximately 50 angstroms.

Electrically conductive material 120 is preferably associated with front surface 114A of second substrate 114, and is operatively bonded to either electrically conductive material 118 or nucleation layer 119 by sealing member 122. As can be seen in FIG. 1, once bonded, sealing member 122 and the juxtaposed portions of electrically conductive material 118 or nucleation layer 119 and electrically conductive material 120 serve to define an inner peripheral geometry of chamber 116. Electrically conductive material 120 may be fabricated from similar materials as that of electrically conductive material 118.

Sealing member 122 may comprise any material that is capable of being adhesively bonded to the electrically conductive material 118 or nucleation layer 119 and electrically conductive material 120 to, in turn, seal chamber 116 so that electrochemical medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 and nucleation layer 119 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. No. 4,297,401 entitled "Liquid Crystal Display And Photopolymerizable Sealant Therefor," U.S. Pat. No. 4,418,102 entitled "Liquid Crystal Displays Having Improved Hermetic Seal," U.S. Pat. No. 4,695,490 entitled "Seal For Liquid Crystal Display," U.S. Pat. No. 5,596,023 entitled "Sealing Material For Liquid Crystal Display Panel, And Liquid Crystal Display Panel Using It," U.S. Pat. No. 5,596,024 entitled "Sealing Composition For Liquid Crystal," and U.S. Pat. No. 6,157,480 entitled "Seal For Electrochromic Devices," all of which are hereby incorporated herein by reference in their entirety.

For purposes of the present disclosure, electrochemical medium 124 comprises at least one solvent, an anodic material, and a cathodic material, preferably wherein the concentration of the anodic material relative to the cathodic material is controllably selected which, as will be shown experimentally below, serves to enhance durability and/or reversible deposition uniformity of the electrodeposition devices relative to the same without such controlled media concentrations.

Both of the anodic and cathodic materials are electroactive, and at least one may be electrochromic. It will be understood that regardless of its ordinary meaning, the term "electroactive" will be defined herein as a material that undergoes a modification in its oxidation state upon exposure to a particular electrical potential difference. Furthermore, it will be understood that the term "electrochromic" will be defined herein, regardless of its ordinary meaning, as a material that exhibits a change in its extinction coefficient at one or more wavelengths upon exposure to a particular electrical potential difference.

Cathodic materials may include, for example, salts of active metals such as silver, copper, bismuth, and ligands associated with the same. Silver is especially preferred because it is colorless in its ionic state and upon single electron reduction forms an achromic highly reflective metallic film. While specific cathodic materials have been provided for illustrative purposes only, numerous other cathodic materials that would be known to those with ordinary skill in the art having the present disclosure before them are likewise contemplated for use. It will be understood that the above-identified cathodic materials can be incorporated in any electrochromic medium so long as the same are capable of reduction proximate nucleation layer 119.

For purposes of the present invention, anodic materials may include any one of a number of materials including ferrocene, substituted ferrocenes, substituted ferrocenyl salts, substituted phenazines, phenothiazine, substituted phenothiazines, thianthrene, substituted thianthrenes, hydroquinones, and substituted hydroquinones. Examples of anodic materials may include di-tert-butyl-diethylferrocene, 5,10-dimethyl-5,10-dihydrophenazine, 3,7,10-trimethylphenothiazine, 2,3,7,8-tetramethoxythianthrene, and 10-methylphenothiazine, as well as those provided in experiments infra. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof," U.S. Pat. No. 5,988,617 entitled "Electrochromic Compounds," U.S. Pat. No. 6,188,505 B1 entitled "Color-Stabilized Electrochromic Devices," and U.S. application Ser. No. 10/054,108 entitled "Controlled Diffusion Coefficient Electrochromic Materials For Use In Electrochromic Mediums And Associated Electrochromic Devices," all of which are hereby incorporated herein by reference in their entirety. These materials may or may not persist in solution upon electrochemical oxidation. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be further understood that the anodic materials may be immobilized in a sol-gel.

The electrochemical medium can also be gelled or comprise a crosslinked polymer matrix as is described in U.S. Pat. No. 5,679,283 entitled "Electrochromic Layer and Devices Comprising Same," which is hereby incorporated herein by reference in its entirety.

Electrochemical medium 124 may also comprise complexing agents, such as, but not limited to, pyridines; bipyridines, such as 2,2'-bipyridine; 1,10-phenathrolines; imidazoles; crown ethers; polyethylene glycol; thiourea; halides, including chloride, iodide, and bromide; and triphenylphosphine or other phosphine ligands—as well as those provided in the experiments infra. Such agents can cause the cathodic material to become more stable in a variety of solvents as well as shift the reduction potential toward more negative potentials, for example, in the case of cationic silver, cathodic peak potential shifts of approximately 0.5 volts (V) to approximately 1.0 V were observed in common solvents such as propylene carbonate (PC), gamma-butyrolactone (GBL), and N,N-dimethyl formamide (DMF). These complexing agents have also been reported to enhance the uniformity of deposition when the cathodic material is deposited.

Electrochemical medium 124 may also comprise one or more redox buffers, color-stabilizers, and/or additives consistent with those disclosed in U.S. Pat. Nos. 6,188,505, 6,310,714, 6,433,914, and/or U.S. application Ser. No. 10/208,525, all of which are entitled "Color-Stabilized Electrochromic Devices," and all of which are hereby incorporated herein by reference in their entirety.

In addition, electrochemical medium 124 may comprise other materials, such as light absorbers, light stabilizers, thermal stabilizers, antioxidants, thickeners, viscosity modifiers, tint providing agents, and mixtures thereof. Suitable UV-stabilizers may include: the material ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

For illustrative purposes only, the concentration of the anodic and cathodic materials can range from approximately 1 millimolar (mM) to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing electrochemical medium 124.

Without being bound to any one particular theory, it is believed that, unlike may prior art devices, the inclusion of excess anodic material in devices of the present invention inhibits undesirable oxidation of other components, such as solvent, in the medium—which leads to device degradation. Similarly, the inclusion of a redox buffer inhibits undesirable side reactions in the device.

For purposes of the present disclosure, the solvent of electrochemical medium 124 may comprise any one of a number of common, commercially available solvents, including 3-methylsulfolane; dimethyl sulfoxide; N,N-dimethyl formamide (DMF); glymes, such as di(ethyleneglycol) methylether, tetraglyme, and other polyethers; alcohols, such as ethoxyethanol, glycols, etcetera; nitrites, such as acetonitrile, glutaronitrile, 3-hydroxypropionitrile, and 2-methylglutaronitrile; ketones, including 2-acetylbutyrolactone, and cyclopentanone; cyclic esters including beta-propiolactone, gamma-butyrolactone (GBL), and gamma-valerolactone; propylene carbonate (PC), ethylene carbonate; ionic liquids (See U.S. Pat. No. 6,552,843—which is hereby incorporated herein by reference in its entirety) and homogenous mixtures of the same. While specific solvents have been disclosed as being associated with the electrochemical medium, numerous other solvents that would be known to those having ordinary skill in the art having the present disclosure before them are likewise contemplated for use.

Electrodeposition as disclosed herein can be used in a wide variety of applications wherein the transmitted or reflected light can be modulated. Such devices include rear-view mirrors for vehicles; windows for the exterior of a building, home or vehicle; skylights for buildings including tubular light filters; windows in office or room partitions; display devices; variable reflectors —just to name a few.

The electrochemical media of the present invention utilize many different materials, the preparation and/or commercially available sources are provided herein, unless the material is well known in the art. It will be understood that, unless specified otherwise, the starting reagents are commercially available from Aldrich Chemical Co., of Milwaukee, Wis., Ciba-Geigy Corp., and/or other common chemical suppliers. It will be further understood that conventional chemical abbreviations will be used when appropriate including the following: grams (g); milliliters (mL); moles (mol); millimoles (mmol); molar (M); millimolar (mM); pounds per square inch (psi); hours (h); and degrees Centigrade (° C.).

Preparation of (6-(tri-tert-butylferrocenyl)hexyl) triethylammonium tetrafluoroborate It will be understood that (6-(tri-tert-butylferrocenyl) hexyl)triethyl-ammonium tetrafluoroborate was prepared in a generally analogous manner to (6-(tetra-tert-butylferrocenyl)hexyl)triethylammonium tetrafluoroborate as is disclosed in U.S. Pat. No. 6,188,505 with the following material modifications.

To a $N_2$ purged flask, filled with 500 mL of dichloroethane, 50 g of 1,1',3,3'-tetra(tert-butyl)ferrocene ($Bu_4Fc$) was added followed by 26.8 g of 6-bromohexanoyl chloride dissolved in 100 mL of dichloroethane. 20 g of $AlCl_3$ was added to the solution slowly enough that the temperature could be kept below about 30° C.–35° C. The reaction was continued until only trace amounts of starting $Bu_4Fc$ were evident by thin layer chromatography using hexane as the eluent. The reaction was then quenched by slowly pouring into water, with stirring. A sufficient quantity of diethyl ether was added to the stirring mixture to allow for phase separation, and zinc dust was added to convert any green ferrocinium species present in the aqueous layer to the organic soluble ferrocene derivative. Once the aqueous layer was nearly colorless, the phases were separated and the aqueous layer was extracted with another portion of diethyl ether. The combined organic portions were then washed with $NaHCO_3$ and brine, followed by drying over anhydrous $MgSO_4$. After filtering the solution, the solvent was removed to leave a red oil. The red oil was then washed with cold hexane to remove any residual $Bu_4Fc$, and the product (6-bromo-1-tri(tert-butyl)ferrocenyl-1-hexanone) was isolated by chromatography on silica. The remaining synthesis of (6-(tri-tert-butylferrocenyl)-hexyl)triethylammonium tetrafluoroborate were carried out in a generally analogous manner to that as is provided in U.S. Pat. No. 6,188,505 relative to the preparation of (6-(tetra-tert-butylferrocenyl) hexyl)triethylammonium tetrafluoroborate.

It will be further understood that the preparation of (6-(tri-tert-butylferrocinium)hexyl)triethylammonium tetrafluoroborate was carried out in an analogous manner to that as is provided in U.S. Pat. No. 6,188,505 relative to the preparation of (6-(tetra-tert-butylferrocinium)hexyl)triethylammonium tetrafluoroborate.

In support of the present invention, several experiments were conducted wherein the concentration of the anodic material was controllably configured relative to the cathodic material, toward analyzing the electrochemical performance of the electrodeposition devices. In addition, the electrochemical performance of the electrodeposition devices having one or more redox buffers were compared to electrodeposition devices void of the same.

In each one of the examples provided herein below, the electrodeposition devices prepared were approximately 3"×3" and fabricated from a first piece of glass (substrate) coated with ITO (sheet resistance ~10 Ω/□) which was overcoated with a thin layer of platinum metal (25 Å). This substrate was aligned with a piece of ITO coated glass (sheet resistance ~10 Ω/□) with the electrode surfaces facing each other with a perimeter seal and two holes drilled into the ITO coated glass plate for introduction of the medium into the cell. All cycling tests involved continuous switching between applied potentials of 0 V and 0.65 V. One cycle consisted of 30 minutes at each applied potential.

EXPERIMENT NO. 1

In this experiment two electrochemical media were prepared by mixing the following materials together in the concentrations provided below. Once prepared, the electrochemical media were incorporated into the electrodeposition devices for testing disclosed supra:

EXPERIMENT NO. 1A

| Component | Material | Concentration |
|---|---|---|
| Cathodic | Silver triflate | 0.15M |
| Anodic | (6-(tri-tert-butylferrocenyl)hexyl)triethylammonium tetrafluoroborate | 0.15M |
| Solvent | DMF | — |
| Complexing Agent | 2,2'-bipyridine | 1.5M |

EXPERIMENT NO. 1B

| Component | Material | Concentration |
|---|---|---|
| Cathodic | Silver triflate | 0.08M |
| Anodic | (6-(tri-tert-butylferrocenyl)hexyl)triethylammonium tetrafluoroborate | 0.08M |
| Solvent | DMF | — |
| Complexing Agent | 2,2'-bipyridine | 1.0M |
| Redox Buffer | (6-(tri-tert-butylferrocinium)hexyl)triethylammonium tetrafluoroborate | 0.012M |

Both devices exhibited a yellow to green-yellow color and had a white light transmission of 52%. A uniform bright silver film was observed for both devices when 0.6–0.7 V was applied with a white light transmission of less than 1%. The devices were cycled at 0.65 V for 360 cycles. After cycling, device (1A) exhibited a hazy deposit that would not completely dissolve even after 4 days which caused the transmission in the bleached (0 potential, open circuit) state to decrease from 52% to 48% after cycling. In comparison, device (1B) was clear with no residual deposits and the bleached state transmission remained at 52%—even after 1,338 cycles. As such, Experiment No. 1 verifies that the addition of a redox buffer to an electrochemical medium materially enhances the electrochemical performance of an associated electrodeposition device, relative to an electrodeposition device having anodic and cathodic materials of the same concentration.

EXPERIMENT NO. 2

In this experiment two electrochemical media were prepared by mixing the following materials together in the concentrations provided below. Once prepared the electrochemical media were incorporated into the electrodeposition devices for testing disclosed supra:

EXPERIMENT NO. 2A

| Component | Material | Concentration |
| --- | --- | --- |
| Cathodic | Silver triflate | 0.08M |
| Anodic | TEAPphen* | 0.15M |
| Solvent | GBL | — |
| Complexing Agent | Br⁻ (as the tetrabutylammonium salt) | 0.17M |
| Complexing Agent | 2,2'-bipyridine | 0.08M |

*See U.S. application Ser. No. 10/283,506 for preparation

EXPERIMENT NO. 2B

| Component | Material | Concentration |
| --- | --- | --- |
| Cathodic | Silver triflate | 0.08M |
| Anodic | TEAPphen* | 0.15M |
| Solvent | GBL | — |
| Complexing Agent | Br⁻ (as the tetrabutylammonium salt) | 0.17M |
| Complexing Agent | 2,2'-bipyridine | 0.08M |
| Redox Buffer A | Decamethyl ferrocene** | 0.005M |
| Redox Buffer B | Decamethyl ferrocinium tetrafluoroborate** | 0.005M |

*See U.S. application Ser. No. 10/283,506 for preparation
**See U.S. Pat. No. 6,392,783 for preparation The addition of the ferrocene/ferrocinium redox buffer caused the device with medium 2B to show superior durability when devices 2A and 2B were cycled at 0.65V. After 750 cycles device 2A showed large areas of the electrode where the silver film did not completely erase. In comparison, device 2B promptly returned to its high transmittance state after the electrical potential was removed.

EXPERIMENT NO. 3

In this experiment two electrochemical media were prepared by mixing the following materials together in the concentrations provided below. Once prepared the electrochemical media were incorporated into the electrodeposition devices for testing disclosed supra:

EXPERIMENT NO. 3A

| Component | Material | Concentration |
| --- | --- | --- |
| Cathodic | Silver triflate | 0.15M |
| Anodic | TEAPphen* | 0.15M |
| Solvent | PC | — |
| Complexing Agent | Br⁻ (as the tetrabutylammonium salt) | 0.35M |
| Redox Buffer | Decamethyl ferrocene** | 0.010M |

*See U.S. application Ser. No. 10/283,506 for preparation
**See U.S. Pat. No. 6,392,783 for preparation

EXPERIMENT NO. 3B

| Component | Material | Concentration |
| --- | --- | --- |
| Cathodic | Silver triflate | 0.08M |
| Anodic | TEAPphen* | 0.15M |
| Solvent | GBL | — |
| Complexing Agent | Br⁻ (as the tetrabutylammonium salt) | 0.2M |
| Redox Buffer | Decamethyl ferrocene** | 0.01M |

*See U.S. application Ser. No. 10/283,506 for preparation
**See U.S. Pat. No. 6,392,783 for preparation Device 3A exhibited silver deposition beginning with an applied voltage of approximately 0.4V however at higher potentials of 0.6V the deposits became non-uniform. In contrast, device 3B produced a thick uniform silver deposit starting at 0.4V and the silver deposit remained uniform at 0.6V—thus indicating that excess anodic material in solution increases the stability of the deposited metal film.

EXPERIMENT NO. 4

In this experiment one electrochemical medium was prepared by mixing the following materials together in the concentrations provided below. Once prepared the electrochemical medium was incorporated into the electrodeposition devices for testing disclosed supra:

EXPERIMENT NO. 4

| Component | Material | Concentration |
| --- | --- | --- |
| Cathodic | Silver triflate | 0.08M |
| Anodic | TEAPphen* | 0.15M |
| Solvent | DMF | — |
| Complexing Agent | Br⁻ (as the tetrabutylammonium salt) | 0.20M |
| Redox Buffer A | Decamethyl ferrocene** | 0.005M |
| Redox Buffer B | Decamethyl ferrocinium tetrafluoroborate** | 0.005M |

*See U.S. application Ser. No. 10/283,506 for preparation
**See U.S. Pat. No. 6,392,783 for preparation Device 4 exhibited a high transmittance state with 62% white light transmittance and a low transmittance state of 4%. The device was cycled between the high and low transmittance states for 4 weeks (600 cycles) with no appreciable change in its characteristics.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. A reversible electrodeposition device, comprising:
   a first substrate having an electrically conductive material associated therewith;
   a second substrate having an electrically conductive material associated therewith;
   a nucleation layer at least partially covering at least one of the electrically conductive materials of the first and second substrates;
   an electrochemical medium contained within a chamber positioned between the first and second substrates which comprises:
   at least one solvent;
   an anodic electroactive material;
   a cathodic electroactive material; and
   a redox buffer.

2. The reversible electrodeposition device according to claim 1, wherein the redox buffer is more easily reduced than the cathodic material.

3. The reversible electrodeposition device according to claim 1, wherein the redox buffer is more easily oxidized than the anodic material.

4. The reversible electrodeposition device according to claim 1, wherein the redox buffer comprises: a first component that is more easily reduced than the cathodic material; and a second component that is more easily oxidized than the anodic material.

5. The reversible electrodeposition device according to claim 1, wherein the cathodic material comprises a salt of an active metal.

6. The reversible electrodeposition device according to claim 1, wherein the concentration of the redox buffer ranges from approximately 1 mM to approximately 50 mM.

7. The reversible electrodeposition device according to claim 1, wherein the electrochemical medium further comprises a complexing agent.

8. The reversible electrodeposition device according to claim 7, wherein the redox buffer is more easily reduced than the cathodic material.

9. The reversible electrodeposition device according to claim 7, wherein the redox buffer is more easily oxidized than the anodic material.

10. The reversible electrodeposition device according to claim 7, wherein the redox buffer comprises: a first component that is more easily reduced than the cathodic material; and a second component that is more easily oxidized than the anodic material.

11. The reversible electrodeposition device according to claim 7, wherein the cathodic material comprises a salt of an active metal.

12. The reversible electrodeposition device according to claim 7, wherein the concentration of the redox buffer ranges from approximately 1 mM to approximately 50 mM.

13. The reversible electrodeposition device according to claim 7, wherein the device is an electrochromic window.

14. A reversible electrodeposition device, comprising:
   a first substrate having an electrically conductive material associated therewith;
   a second substrate having an electrically conductive material associated therewith;
   a nucleation layer at least partially covering at least one of the electrically conductive materials of the first and second substrates;
   an electrochemical medium contained within a chamber positioned between the first and second substrates which comprises:
   at least one solvent;
   an anodic electroactive material; and
   a cathodic electroactive material, wherein the concentration of the anodic electroactive material is greater than the cathodic electroactive material, to, in turn, enhance the electrochemical performance of the electrodeposition device.

15. The reversible electrodeposition device according to claim 14, wherein the electrochemical medium further comprises a redox buffer.

16. The reversible electrodeposition device according to claim 15, wherein the redox buffer is more easily reduced than the cathodic material.

17. The reversible electrodeposition device according to claim 15, wherein the redox buffer is more easily oxidized than the anodic material.

18. The reversible electrodeposition device according to claim 15, wherein the redox buffer comprises: a first component that is more easily reduced than the cathodic material; and a second component that is more easily oxidized than the anodic material.

19. The reversible electrodeposition device according to claim 15, wherein the concentration of the redox buffer ranges from approximately 1 mM to approximately 50 mM.

20. The reversible electrodeposition device according to claim 15, wherein the electrochemical medium further comprises a complexing agent.

21. The reversible electrodeposition device according to claim 14, wherein the cathodic material comprises a salt of an active metal.

22. The reversible electrodeposition device according to claim 14, wherein the device is an electrochromic window.

23. A reversible electrodeposition device, comprising:
   a first substrate having an electrically conductive material associated therewith;
   a second substrate having an electrically conductive material associated therewith;
   a nucleation layer at least partially associated with at least one of the electrically conductive materials of the first and second substrates;
   an electrochemical medium contained within a chamber positioned between the first and second substrates which comprises:
   at least one solvent;
   an anodic electroactive material;
   a cathodic electroactive material, wherein the concentration of the anodic electroactive material is greater than the cathodic electroactive material; and
   a redox buffer.

24. A reversible electrodeposition device, comprising:
   a first substrate having an electrically conductive material associated therewith;
   a second substrate having an electrically conductive material associated therewith;
   a nucleation layer at least partially covering at least one of the electrically conductive materials of the first and second substrates;

an electrochemical medium contained within a chamber positioned between the first and second substrates which comprises:
    at least one solvent;
    an anodic electroactive material;
    a cathodic electroactive material; and
means associated with the electrochemical medium which enhances the electrochemical performance of the electrodeposition device.

25. A reversible electrodeposition window having a non-patterned electrode, comprising:
    a first electrode comprising a first substrate having an electrically conductive material associated therewith;
    a second, non-patterned electrode comprising a second substrate having an electrically conductive material associated therewith;
    a nucleation layer at least partially covering the electrically conductive material of the first substrate;
    an electrochemical medium contained within a chamber positioned between the first and second substrates which comprises:
        at least one solvent;
        an anodic electroactive material; and
        a cathodic electroactive material.

26. The reversible electrodeposition window according to claim 25, wherein the electrochemical medium further comprises a redox buffer.

27. The reversible electrodeposition window according to claim 26, wherein the redox buffer is more easily reduced than the cathodic material.

28. The reversible electrodeposition window according to claim 26, wherein the redox buffer is more easily oxidized than the anodic material.

29. The reversible electrodeposition window according to claim 26, wherein the redox buffer comprises: a first component that is more easily reduced than the cathodic material; and a second component that is more easily oxidized than the anodic material.

30. The reversible electrodeposition window according to claim 26, wherein the concentration of the redox buffer ranges from approximately 1 mM to approximately 50 mM.

31. The reversible electrodeposition window according to claim 25, wherein the cathodic material comprises a salt of an active metal.

32. The reversible electrodeposition window according to claim 25, wherein the concentration of the anodic electroactive material is greater than the cathodic electroactive material.

33. The reversible electrodeposition window according to claim 25, wherein the electrochemical medium further comprises a complexing agent.

34. A reversible electrodeposition device having a non-patterned electrode, comprising:
    a first electrode comprising a first substrate having an electrically conductive material associated therewith;
    a second, non-patterned electrode comprising a second substrate having an electrically conductive material associated therewith;
    a nucleation layer at least partially covering the electrically conductive material of the first substrate;
    an electrochemical medium contained within a chamber positioned between the first and second substrates which comprises:
        at least one solvent;
        at least one anodic electroactive material, wherein the at least one anodic electroactive material is present in solution phase; and
        a cathodic electroactive material.

35. The reversible electrodeposition device according to claim 34, wherein the electrochemical medium further comprises a redox buffer.

36. The reversible electrodeposition device according to claim 35, wherein the redox buffer is more easily reduced than the cathodic material.

37. The reversible electrodeposition device according to claim 35, wherein the redox buffer is more easily oxidized than the at least one anodic material.

38. The reversible electrodeposition device according to claim 35, wherein the redox buffer comprises: a first component that is more easily reduced than the cathodic material; and a second component that is more easily oxidized than the anodic material.

39. The reversible electrodeposition device according to claim 35, wherein the concentration of the redox buffer ranges from approximately 1 mM to approximately 50 mM.

40. The reversible electrodeposition device according to claim 34, wherein the cathodic material comprises a salt of an active metal.

41. The reversible electrodeposition device according to claim 34, wherein the concentration of the at least one anodic electroactive material is greater than the cathodic electroactive material.

42. The reversible electrodeposition device according to claim 34, wherein the electrochemical medium further comprises a complexing agent.

43. The reversible electrodeposition device according to claim 34, wherein the electrochemical medium comprises at least one surface attached anodic material.

44. The reversible electrodeposition device according to claim 34, wherein the same comprises a window.

* * * * *